(12) United States Patent
Kleiner

(10) Patent No.: US 6,457,920 B1
(45) Date of Patent: Oct. 1, 2002

(54) CLAMPING SYSTEM FOR DETACHABLY ASSEMBLING TWO PIECES

(75) Inventor: Gilbert Kleiner, Inzigkofen (DE)

(73) Assignee: Joerg Guehring, Albstadt (DE)

( * ) Notice: Subject to any disclaimer, the term of this patent is extended or adjusted under 35 U.S.C. 154(b) by 0 days.

(21) Appl. No.: 09/555,799

(22) PCT Filed: Dec. 3, 1998

(86) PCT No.: PCT/EP98/07882

§ 371 (c)(1),
(2), (4) Date: Jul. 31, 2000

(87) PCT Pub. No.: WO99/28071

PCT Pub. Date: Jun. 10, 1999

(30) Foreign Application Priority Data

Dec. 3, 1997 (DE) ......................................... 197 53 663

(51) Int. Cl.[7] ............................................. B23B 31/103
(52) U.S. Cl. .................... 409/232; 279/2.19; 279/2.22; 279/67; 279/155; 403/324; 409/234
(58) Field of Search ................................ 409/232, 234, 409/233; 408/239 R, 240; 279/2.02, 2.19, 2.22, 67, 43.3, 155; 403/324, 321, 322.1

(56) References Cited

U.S. PATENT DOCUMENTS

| | | | | |
|---|---|---|---|---|
| 4,978,262 A | * | 12/1990 | Tjernstrom | 408/239 R |
| 5,150,995 A | * | 9/1992 | Reinauer | 408/239 R |
| 5,243,884 A | * | 9/1993 | Haga et al. | 409/234 |
| 5,346,344 A | * | 9/1994 | Kress et al. | 409/234 |
| 5,443,340 A | * | 8/1995 | Reinauer et al. | 408/239 R |
| 5,466,102 A | | 11/1995 | Erickson | |
| 5,722,806 A | * | 3/1998 | Erickson et al. | 408/239 R |
| 5,851,091 A | * | 12/1998 | Klement | 409/232 |
| 5,865,578 A | * | 2/1999 | Benedikter et al. | 409/232 |

FOREIGN PATENT DOCUMENTS

| | | |
|---|---|---|
| DE | 38 07 140 | 12/1988 |
| DE | 92 12 205 | 11/1992 |
| DE | 42 20 873 | 1/1994 |
| DE | 43 03 608 | 8/1994 |
| DE | 295 18 660 | 3/1996 |
| DE | 197 53 663 | 6/1999 |
| FR | 2 754 201 | 4/1998 |
| WO | WO 94/05451 | 3/1994 |
| WO | 95 16533 | 6/1995 |

* cited by examiner

*Primary Examiner*—Daniel W. Howell
(74) *Attorney, Agent, or Firm*—Oblon, Spivak, McClelland, Maier & Neustadt, P.C.

(57) ABSTRACT

A clamping system for detachably assembling two pieces. The clamping system includes a clamping device concentrically mounted in a receiving section which extends in a hollow shaft of one of the two pieces, when the two pieces are engaged. The clamping system further includes at least two clamping bodies which can move in opposite directions and an actuating device which actuates the clamping bodies. The clamping bodies can be engaged with an undercut clamping shoulder of the hollow shaft and disengaged therefrom, whereby a pressure force is applied between the flat surfaces of the two pieces to be assembled.

24 Claims, 11 Drawing Sheets

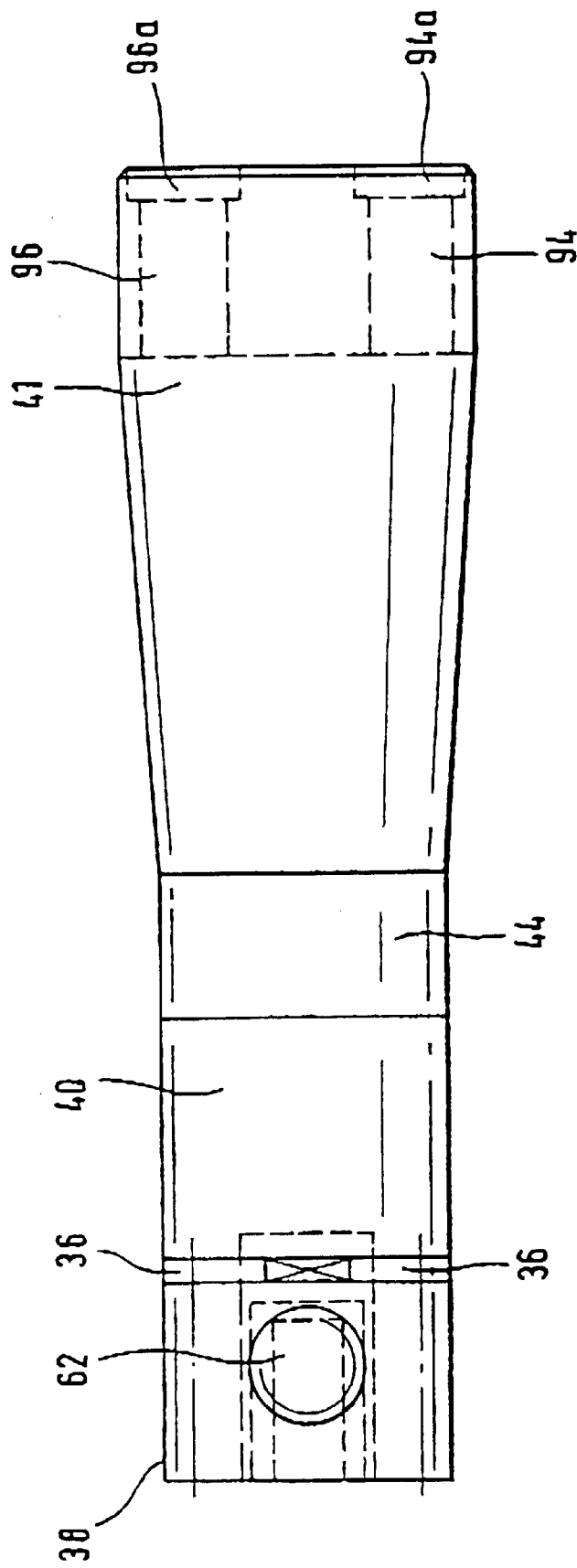

CLAMPING SYSTEM FOR DETACHABLY ASSEMBLING TWO PIECES

FIELD OF THE INVENTION

1. Background of the Invention

The present invention relates to a clamping system for detachably connecting two parts, such as is used for coupling a workpiece or tool carrier, for example in the form of a tool base holder, to a manipulator unit such as a spindle of a machine tool, or for coupling tool system modules to one another.

2. Discussion of the Background

In such clamping systems the objective is to clamp the parts to be connected reliably and firmly against one another, thus ensuring exact positional fixation of the parts to be connected relative to each other via close-fitting engagement between the faces of a hollow shank of the one part and of a holding portion of the other part. The tightening or clamping of the two parts to be connected against one another is achieved by the fact that the hollow shank is pulled into the holding portion against an undercut clamping shoulder formed in the hollow shank during application of clamping members of a clamping device. In the process a pressing force is developed between plane faces of the parts to be connected, so that the two parts clamped against one another are provided with exact axial and also radial positional fixation by the firm connection between the close-fitting faces.

In more recent times there has been increasing acceptance of the hollow-shank clamping system, in which the hollow shank has either cylindrical or tapered structure. In the joined-together condition of the two parts to be connected to each other, the clamping members used for clamping the parts against one another ensure not only that an adequate axial pressing force is developed but also that the hollow shank experiences a certain radial flaring, whereby the accuracy of fit between hollow shank and holding portion is additionally improved.

In conventional clamping systems according to the principle described hereinabove, the assembly and disassembly of the clamping device in the holding portion provided therefor represents a special problem,. however, since the clamping system must also absorb the reactions to the clamping force in addition to ensuring exact axial and radial positional fixation of the two parts to be connected.

From German Patent Application DE A 4220873, there is known a clamping system for detachably connecting two parts, which preferably are rotationally symmetric, of which one part has a preferably cylindrical or tapered hollow shank and the other part has a corresponding holding portion for holding the hollow shank in accurately fitting relationship. There is provided a clamping device which is disposed concentrically in the holding portion and which, in the joined-together condition of the two parts, extends into the hollow shank of the one part and is provided with at least two clamping members which can move in opposite directions as well as with an actuating device for driving the clamping members, by means of which device the clamping members can be synchronously moved into and out of engagement with an undercut clamping shoulder of the hollow shank, whereby a pressing force is generated between plane faces of the two parts to be connected.

This clamping system is based on the principle described hereinabove of clamping two parts to be connected by a clamping device having clamping members. In this clamping system the problem cited hereinabove is solved by exact positional fixation of the parts to be connected, in that a support member decoupled from the clamping members as regards assembly is fixed interlockingly in the holding portion. The positionally fixed support member brings about bracing of the clamping members and thus indirectly absorbs the reactions to the clamping force. The indirect absorption of the reaction via the support member as well as the fastening and positional fixation thereof can be achieved, however, only by additional fixing and fastening elements. Furthermore, special assembly attachments are generally necessary.

In another known clamping system, as is described, for example, in German Patent DE C2 3807140, a plurality of loosely disposed or at least not distinctly fixed clamping elements must be nested interlockingly in the holding portion. In this case an additional support member is indeed unnecessary, but the direct nesting of the clamping elements is associated with considerable assembly complexity, since the individually disposed clamping elements are not distinctly fixed in assembly position. Accordingly, the clamping elements must be moved into a special assembly/disassembly position during assembly/disassembly. Additional components and assembly attachments are necessary for this purpose also.

From German Utility Model DE U1 29518660 there is known a clamping system according to the preamble of the new claim 1.

A threaded sleeve, a clamping ring and a plurality of segmented bracing elements are necessary for fixation of the clamping-element halves in the tool spindle. The head parts of the clamping-element halves are therefore braced against the undercut clamping shoulder of the tool mandrel via a "mechanism" formed by the clamping ring and the bracing elements.

The object of the present invention is therefore to provide a clamping system for two parts to be connected, for example a tool system module and a machine tool spindle, which clamping system on the one hand performs adequately with a minimum of components and on the other hand permits simple, reliable and dimensionally stable coupling of the two parts to be connected without the need for additional assembly or fastening attachments.

This object is achieved by a clamping system with the features of claim 1.

According to the invention, the clamping elements are each provided in a region between head and foot portions with a retaining portion, which can be brought into engagement with an undercut recess of the holding portion.

Just as heretofore, therefore, the clamping members are still designed as head portions of elongated clamping elements disposed substantially parallel to the longitudinal or rotational axis of the holding portion. The clamping elements are constituents of the clamping device. The foot portions of the clamping elements are inventively connected to one another such that the clamping device has substantially the form of a V-shaped or U-shaped split chuck or clamping fork.

These clamping elements can be connected to one another movably, interlockingly and frictionally or in one piece. By means of an actuating device the clamping members can be made to move in opposite directions, or in other words to move toward or apart from one another. The inventive clamping system with such a predetermined arrangement of clamping elements relative to one another therefore obviates the support members which in conventional clamping systems are necessary for the clamping elements or clamping members.

This arrangement of the clamping elements also permits, without additional fixing components, distinct axial as well as radial fixation of the clamping members relative to one another in both the clamped position and detached position of the clamping system. The inventive clamping system is therefore characterized by simple and compact structure, which also permits reliable and dimensionally stable clamping of the parts to be connected without a plurality of loose components. In addition, the connection of the clamping elements in the manner described hereinabove creates a clamping device which, since it does not comprise any loose parts, can be fixed in the holding portion without great mechanical complexity.

Since, moreover, a minimum of movable parts is present in the inventive clamping system, only little friction is developed during movement thereof. In this way a relatively large clamping force is achieved between the two parts to be connected.

Further advantageous embodiments of the inventive clamping system are subject matter of the dependent claims.

The clamping elements are preferably designed as the arms of a U-shaped clamping fork of one-piece construction. In such a configuration the clamping device therefor e comprises only the clamping fork and the actuating device, and so the number of necessary components is reduced to two components. The one-piece configuration of the clamping elements in the form of a clamping fork further creates the possibility of increasing the clamping force between the two parts to be connected by bending stresses of the clamping fork. The clamping force is generated by the spring tension of the clamping fork when the actuating device is released. This spring tension can be adjusted by appropriate forming in the stress-free condition. The one-piece design of the clamping elements in the form of an elastically deformable clamping fork also permits simple assembly of the clamping device in the holding portion, since there is no need to dispose and fix a plurality of loose components.

It is also possible, however, to connect the clamping elements of the clamping device by an articulated joint which includes the foot portions of the clamping elements, the axis of rotation of which joint is disposed perpendicular to the longitudinal or rotational axis of the parts to be connected. This design provides substantially the same advantages as the one-piece design of the clamping elements.

The clamping device of the inventive clamping system is preferably provided in a region between head and foot portions with a radially outwardly projecting retaining portion in the form. of a clamping shoulder, and by means of this retaining portion can be nested in an undercut recess of the holding portion. By virtue of this technically simple expedient the clamping device can be engaged with or disengaged from the recess of the holding portion synchronously with the movement of the clamping members or with the pivoting movement of the clamping elements, depending on whether the clamping members are engaged with or disengaged from the undercut clamping shoulder of the hollow shank. Accordingly, therefore, axial fixation of the clamping device in the holding portion can be achieved without additional fixing elements.

In particular, the configuration of the recess in the form of a closed annular cross section does not represent any weakening of the nesting shoulder of the recess of the holding portion, as can occur in conventional clamping systems, for example due to countersunk portions in the case of a bayonet fastener. Compared with the production of a plurality of recesses, which extend in the direction of rotation of the tool holder only over portions of the inside circumferential wall of the holding portion, the production of a single recess in the form of a closed annular cross section additionally proves to be particularly simple. Such a configuration has also proved to be advantageous with regard to assembly of the clamping device, since the clamping device can be introduced: into the holding portion without any concern over its angular orientation relative to the holding portion.

In order to achieve the highest possible pressing force between the two parts to be connected, it has proved particularly advantageous to provide each of the clamping members with one wedge face, which cooperates with a mating wedge face provided on an undercut clamping shoulder of the hollow shank, this clamping shoulder preferably being formed by a recess in the form of a closed annular cross section. By means of this type of configuration, therefore, there can be created a wedge-type mechanism, which is characterized by relatively high efficiency.

According to a further development of the inventive clamping system, there is provided a push-off attachment which is automatically actuated or moved axially upon detachment of the engagement of the clamping members with the undercut clamping shoulder of the hollow shank. Axial actuation of the push-off attachment leads to separation of the two connected parts. In this case the forced movement of the clamping members upon detachment of the clamped engagement of the clamping members with the undercut shoulder can be utilized to generate a push-off force acting axially on the components to be separated.

According to the invention this is accomplished in simple manner by a push-off piston as part of the push-off attachment, which piston is disposed in a central recess of the part supporting the hollow shank and which, when the engagement of the clamping members with the undercut clamping shoulder of the hollow shank: is detached, can press synchronously with increasing force against a bracing face of the part supporting the hollow shank. By virtue of the central disposition of the push-off piston, therefore, a centrally acting, positive force is applied on the part supporting the hollow shank, ultimately leading to separation of the two connected parts. Because of the centrally acting force on the part supporting the hollow shank, the jamming and faulty gripping of the two parts that occur under some circumstances can also be prevented.

For this purpose it has proved advantageous to provide on the push-off piston a tapered face over which the clamping members can travel upon detachment of the clamping system. A sufficiently large push-off force between the parts can be generated with this simple "wedge-type mechanism", and so even a firm connection produced by the fact that two parts with tapered close-fitting faces have been clamped together . . . with the detachment of the engagement of the clamping members with the undercut . . . .

When the push-off piston and the clamping device are held in sealed relationship in the corresponding recesses, preferably by sealing rings disposed in appropriate recesses, a coolant and lubricant can additionally be supplied via the parts clamped against one another to, for example, a cutting tool clamped in the one part. The seal of the push-off piston and of the clamping device can also be used to stabilize these components, and so vibration-induced chattering noise can be prevented.

Accordingly, the inventive clamping system can be combined with a coolant and lubricant supply system. This coolant and lubricant supply system comprises in particular a channel portion which is formed in the part supporting the holding portion, a channel portion which is formed in the part supporting the hollow shank, plus at least one line portion which bridges the clamping device and ensures fixation of its angular orientation. The line portion of the coolant and lubricant supply system can then ensure fixation of the angular orientation of the clamping device in the holding portion, and so further structural expedients or other fixation elements are not needed in this regard.

The line portion is preferably designed as a tube which is disposed between the parts to be connected, the end of this tube on the hollow-shaft side being held interlockingly and/or frictionally, preferably by sealed brazed joint, in a corresponding recess of the push-off piston, the shank portion of this tube being guided movably, preferably in a manner sealed by a sealing ring, through a corresponding recess in the connecting portion of the foot portions of the clamping elements, and the end of this tube on the holding-portion side being held in close-fitting relationship in a corresponding recess in the part supporting the holding portion.

As already described hereinabove, the line portion or the tube can be used for fixation of the angular orientation of the clamping device in the holding portion. The line portion or the tube is then disposed between the clamping members in such a way that the clamping members pinch the line portion or the tube between them when the clamping system is in detached position. This means that the coolant and lubricant supply system is securely retained in the holding portion without the need for additional fixation elements when the clamping system is in detached position.

Preferably the parts to be connected are designed as rotationally symmetric parts and the pressing faces of the parts to be connected are designed as radial annular faces. This contributes decisively to a simple and thus low-cost clamping system.

In order to achieve the most intimate possible connection between the two parts to be connected and thus to keep the torque-transfer losses as small as possible, the close-fitting faces between hollow shank and holding portion preferably have the form of tapered faces.

The drive of the actuation device is provided preferably via a radial opening oriented perpendicular to the longitudinal or rotational axis of the two parts to be connected, preferably via a radial bore, into which a tool, in the form, for example, of an Allen key, . . . from outside.

Furthermore, in a preferred embodiment of the clamping system, the actuating device for actuating the clamping members is constructed as a tightening screw with a head portion and a threaded portion, the head portion being disposed in a correspondingly configured recess of the one clamping member and the threaded portion in a corresponding threaded bore of the other clamping member.

An advantageous embodiment of the tightening screw has been found to be one in which the threaded portion of the tightening screw has a left-hand threaded portion and a right-hand threaded portion, of which one is disposed in the threaded bore of the other clamping member and the other is disposed in a nut functioning as the head portion, the nut being disposed in the correspondingly configured recess of the one clamping member. The advantage of this embodiment is that, by virtue of the left-hand/right-hand thread of the tightening screw, relatively small turning movements are necessary in order to bring about a relatively large "stroke" of the clamping elements; furthermore, the nut functioning as the head portion is subjected only to tension and thus does not undergo any frictional wear.

In addition to a rotationally symmetric configuration of the two parts to be connected, it has proved advantageous to make the clamping device also from a cylindrical part, so that the clamping elements and the clamping members have an arcuate outside face and the foot portion of the clamping elements has a cylindrical outside face.

As regards a simple possibility for limiting the clamping stroke of the clamping members, it has proved to be particularly advantageous when the clamping elements can bear against the inside circumferential wall of the recess of the holding portion while the two parts to be connected are in the tightened or clamped-together condition. In this way a maximum permissible clamping stroke of the clamping elements and thus of the clamping members can be safely maintained without additional limiting elements or stops.

In order to shorten the axial overall length of the clamping device and thus of the clamping system as a whole by a structurally simple means, it is further advantageous to provide each clamping element on the side of its foot portion with at least one notch which reduces the cross section. Thereby the force necessary to pinch the clamping elements together can be reduced and, as a positive consequence thereof, the necessary "lever-arm length" of the clamping elements can be considerably shortened.

Further advantageous features of the present invention will become apparent from the description hereinafter, wherein a preferred practical example of this invention will be explained in more detail with reference to a schematic drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a schematic top view of the clamping device in FIG. 5;

DESCRIPTION OF THE PREFERRED EMBODIMENTS

Figure 1:
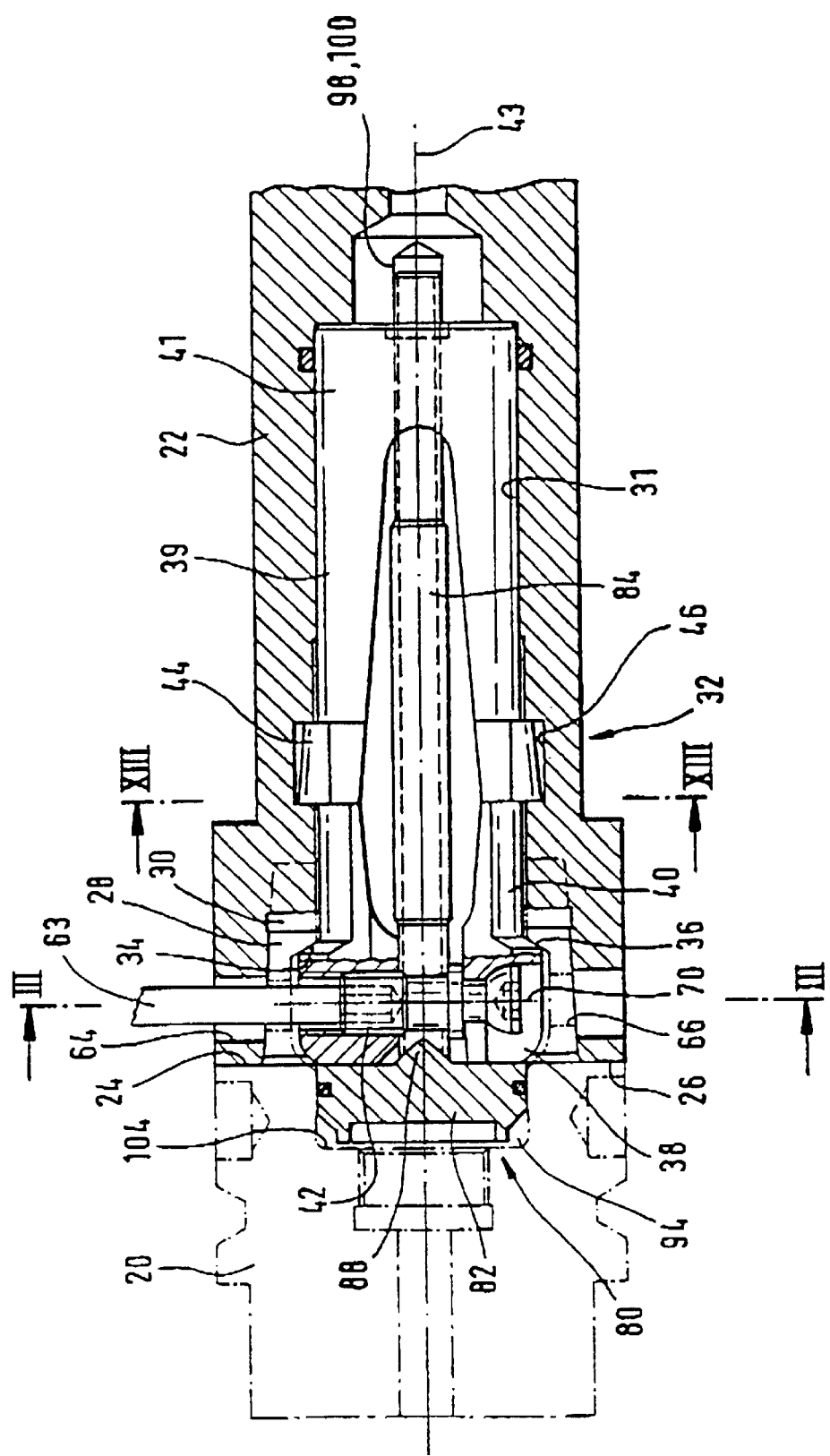
FIG. 1 a schematic axial section—in partly cutaway view—of the inventive clamping system according to the preferred practical example with the two parts to be connected in clamped-together condition.
Figure 2:
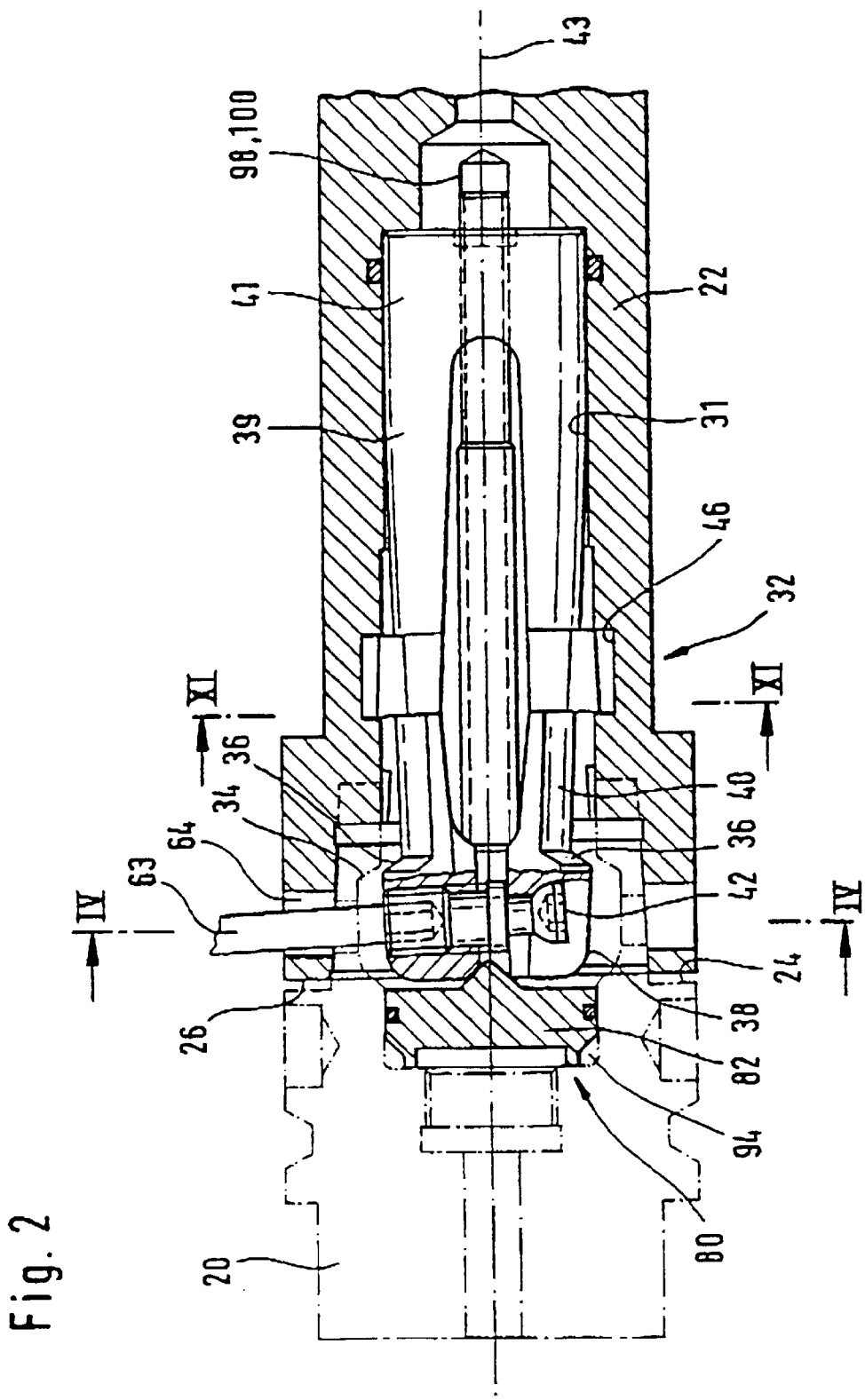
FIG. 2 is a schematic axial section—in partly cutaway view—of the inventive clamping system according to the preferred practical example with the two parts to be connected in clamped-together condition.

FIGS. 1 and 2 there is illustrated a part denoted by reference numeral 20 and referred to hereinafter as the tool, for example a tool system module in the form of a tool base holder, and a part denoted by reference numeral 22 and referred to hereinafter as the tool holder, for example a spindle of a machine tool. It must be emphasized here and now, however, that the clamping system to be described in more detail hereinafter relates to the interface of two parts to be connected and is therefore qualified for all practical applications in which it is necessary to connect two parts to one another in centered and detachable relationship.

Figure 3:
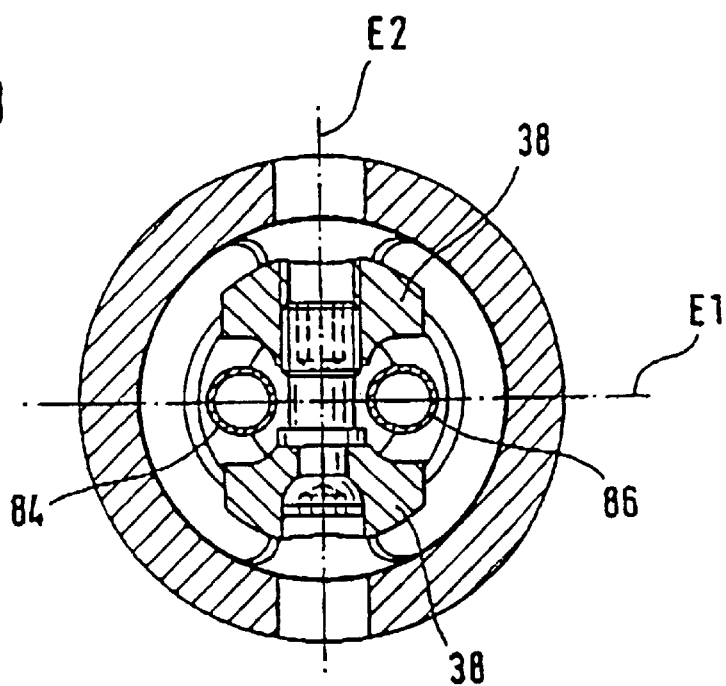
FIG. 3 is a cross section through the inventive clamping system in FIG. 1 along line "III—III"

In FIG. 1 and FIG. 3, tool 20 and tool holder 22 are shown in the clamped-together condition or tightened condition, in which a radial annular face 24 of tool 20 is pressed against a radial annular face 26 of tool holder 22, while at the same time a hollow shank 28 of tool 20 is held in centered relationship in a corresponding recess 30 of a holding portion 32 of tool holder 22.

Figure 4:
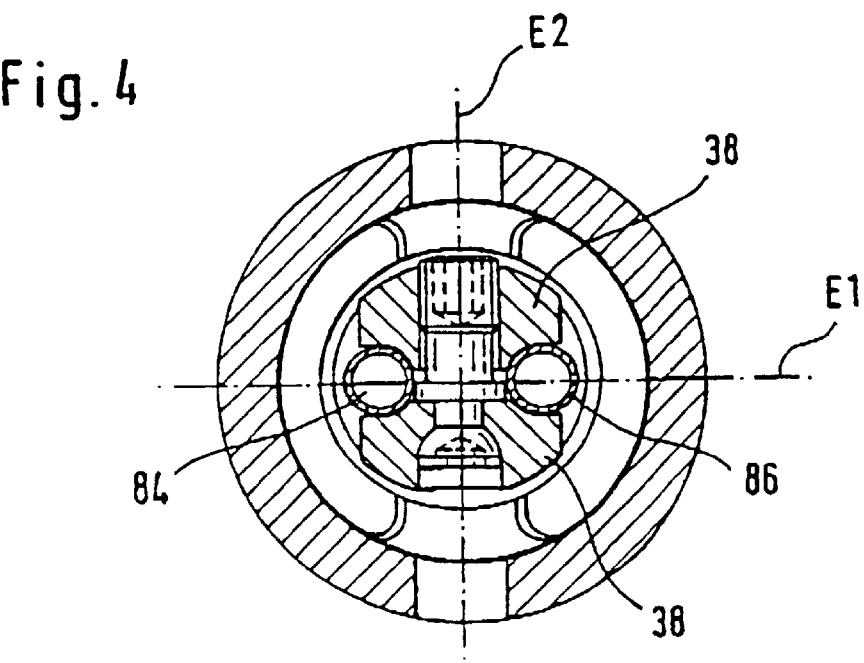
FIG. 4 is a cross section through the inventive clamping system in FIG. 2 along line "IV—IV"

FIG. 2 and FIG. 4 show tool 20 and tool holder 22 in the joined-together but not clamped-together condition. Even in this condition, hollow shank 28 of tool 20 is already held in recess 30 of tool holder 22. Between the two radial annular faces 24, 26, however, there is formed a plane gap, since tool 20 becomes stopped against a push-off piston 82 of a push-off attachment 80 to be described in more detail hereinafter.

In the practical example shown in FIG. 1 and FIG. 2, the close-fitting faces between hollow shank 28 and recess 30 are formed by tapered faces. It is equally possible, however, to provide for centering of hollow shank 28 in recess 30 via cylindrical faces.

Although the intimate connection between the tapered close-fitting faces already ensures that tool 20 and tool holder 22 are secured against relative turning when tool 20 and tool holder 22 are in clamped-together condition, additional security against relative turning between tool 20 and tool holder 22 can also be achieved by, for example, at least one tang block, which engages in a corresponding end recess either of the hollow shank or of the holding portion.

In the practical example shown in FIG. 1 and FIG. 2, parts 20, 22 to be connected as well as hollow shank 28 and the recesses formed in these parts, such as recess 30, have rotationally symmetric geometry. It must be emphasized, however, that the invention is not limited merely to such geometry.

The inventive clamping system must be capable of clamping parts 20, 22 to be connected firmly against one another in predesignated radial and also axial position. A further feature essential to the invention, besides a minimal number of components and simple assembly capability, is easy detachability of the connected parts in combination with short stroke distances. For this purpose the inventive clamping system has the following structure:

Hollow shank 28 is provided on the inside with a radially oriented undercut clamping shoulder 34. Clamping shoulder 34 is formed by a wedge face of an annular recess of hollow shank 28, this face being directed toward the tool holder. During actuation of the clamping system, wedge faces 36 of two clamping members 38 can bear against clamping shoulder 34, in order to bring about, preferably with force conversion, firm clamping of tool 20 against tool holder 22.

Figure 6:
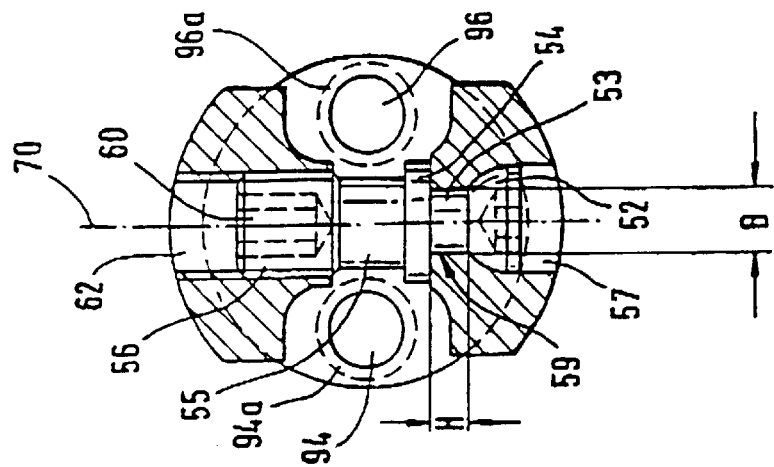
FIG. 6 is a cross section through the clamping device along line "VI—VI" in FIG. 5.
Figure 5:
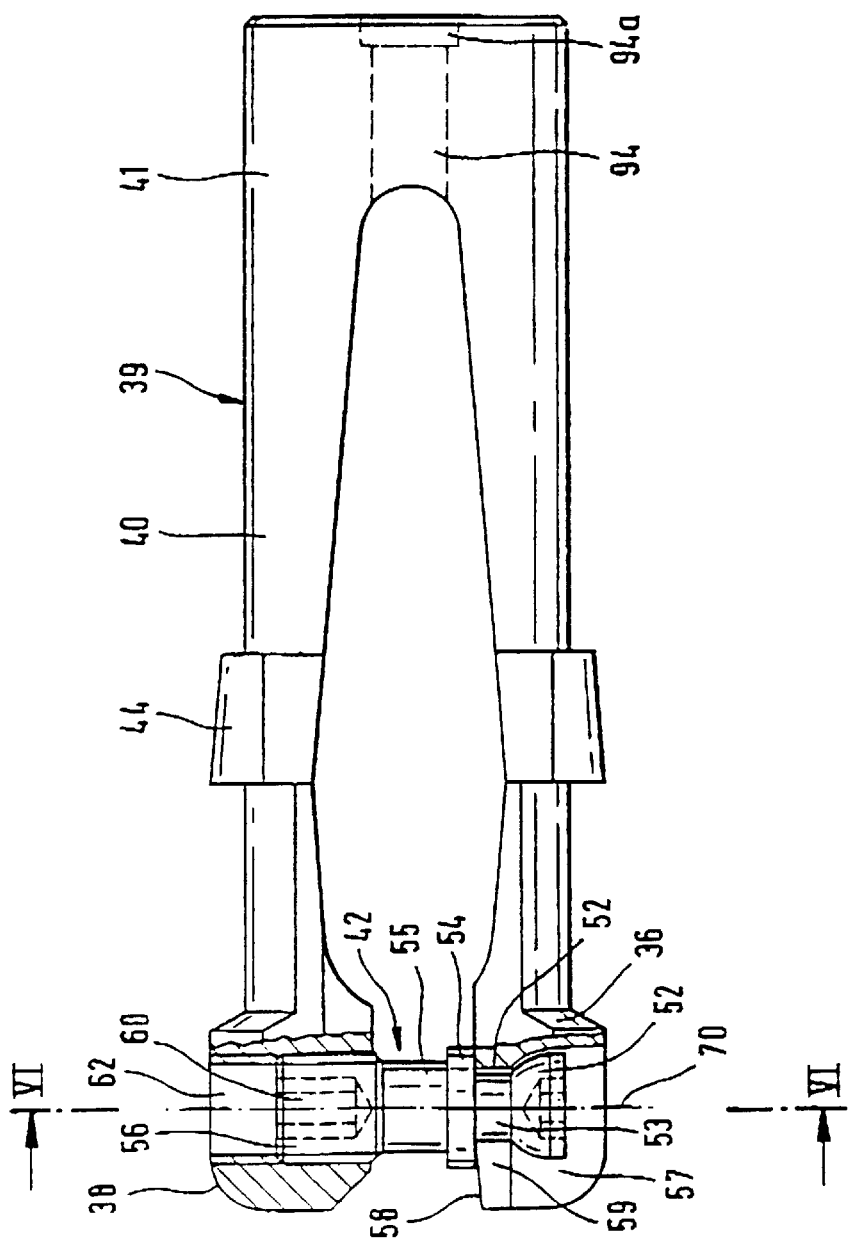
FIG. 5 is a schematic view—partly cutaway—of a clamping device of the inventive clamping system.

In an axial guide recess 31 of holding portion 32 of tool holder 22 there is disposed a clamping device 39, which at the bottom of the guide recess bears via a sealing ring against the inside circumferential wall of guide recess 31. As can be seen in FIG. 5 and FIG. 6 in particular, clamping device 39 comprises a U-shaped clamping fork of one-piece structure and an actuating device in the form of a tightening screw 42. The clamping fork is preferably made from a cylindrical member, as can also be recognized from the diagram according to FIG. 6. FIG. 7 shows a top view of the clamping fork. It comprises two clamping elements 40, which are oriented substantially parallel to longitudinal or rotational axis 43 of tool holder 22, and which are formed by the arms of the U-shaped clamping fork. Clamping elements 40 preferably have an arcuate outside face corresponding to the circumferential face of axial guide recess 31 of holding portion 32. The head portions of the two clamping elements 40 form clamping members 38, which are equipped with wedge faces 36. As can be seen in FIGS. 5 and 6 and will be described in more detail hereinafter, tightening screw 42 is connected interlockingly and frictionally with the two clamping members 38. Clamping elements 40 are connected to one another in one piece at their foot portions 41, preferably in the form of a "material articulated joint". According to the present invention, however, it would also be possible to design the foot portions of clamping elements 40 as constituents of an articulated joint connecting clamping elements 40.

Between clamping members 38 and articulated joint 41 there are provided on clamping elements 40 retaining portions 44, with which clamping device 39 can be nested in an undercut recess 46 of axial guide recess 31 of holding portion 32 and thus can be fixed axially in tool holder 22. Undercut recess 46 has a closed annular cross section. Since the clamping fork, as mentioned hereinabove, has a cylindrical outside contour, retaining portions 44 are accordingly disposed in diametrically opposite relationship on clamping elements 40 and have the form of radially projecting bracing noses or shoulder portions.

According to the diagram in FIG. 5 and FIG. 6, tightening screw 42 has a spherical head portion 52, a neck portion 53 adjoining head portion 52 and having diameter smaller than that of the head portion, an annular portion 54 following neck portion 53 and having diameter larger than that of neck portion 53, a shank portion 55 adjoining annular portion 54 and having diameter smaller than that of a threaded bore 62 of upper clamping member 38 in FIG. 5, as well as a threaded portion 56 which adjoins shank portion 55 and is held in threaded bore 62 of upper clamping member 38 in FIG. 5. Threaded portion 56 of tightening screw 42 has a recess 60 indicated by broken lines, preferably a hexagon socket.

Lower clamping member 38 in FIG. 5 has a concave recess 57 corresponding substantially to the contour of spherical head portion 52, this recess being limited in the direction of the upper clamping member by a bottom portion 58, which has a height H (FIG. 6) corresponding approximately to the axial length of neck portion 53. Bottom portion 58 is provided with a slot 59, which starts from its end side, or in other words from the left side in FIG. 5, and which has a width B (FIG. 6) somewhat larger than the diameter of neck portion 53. Tightening screw 42 can therefore be inserted with its neck portion 53 into slot 59, as is shown, for example, in FIG. 5 and FIG. 6, in which case bottom portion 58 of recess 57 is held with clearance between head portion 52 and annular portion 54.

Upper clamping member 38 in FIG. 5 has a threaded bore 62, in which there is held threaded portion 56 of tightening screw 42. Threaded portion 56 is therefore functionally engaged with clamping member 38.

As already mentioned hereinabove, tightening screw 42 is connected to the two clamping members 38 of clamping device 39. Thus, when tightening screw 42 is turned, it brings about pivoting movement of clamping elements 40 around an imaginary axis of rotation (not illustrated) oriented perpendicular to axis 43 of tool holder 22. As illustrated in FIGS. 1 and 2, turning of tightening screw 42 is achieved by a tool 63 introduced radially from outside in a direction substantially perpendicular to longitudinal or rotational axis 43 of tool holder 22, the said tool preferably having the form of an Allen key, which is introduced through a radial opening 64 in holding portion 32 of tool holder 22 on the one hand and through a radial opening 66 in hollow shank 28 of tool 20 on the other hand into the aforesaid recess 60 of tightening screw 42.

From FIG. 1 and FIG. 2 it is further apparent that a rotational axis 70 of tightening screw 42 is substantially aligned with the axes of radial openings 64, 66. Radial openings 64, 66 are preferably designed as bores.

When tightening screw 42 is turned to the right, it leads to synchronous movement of clamping members 38 apart from one another and thus to clamping of tool 20 against tool holder 22. When tightening screw 42 is turned to the left, it leads to synchronous movement of clamping members 38 toward one another and thus to detachment of the wedge-type surface connection between wedge faces 34, 36 and thus of the connection of tool 20 and tool holder 22. By virtue of the detachment of the clamping system, or in other words the movement of the two clamping members 38 together as a result of the turning of tightening screw 42 to the left, there are generated in clamping elements 40 and in foot or connecting portion 41 bending stresses, which of course are relaxed once again when the clamping system is tightened, or in other words when clamping members 38 are moved apart from one another as a result of the turning of tightening screw 42 to the right, and which therefore support the stroke of clamping members 38 in radially outward direction as well as the clamping of tool 20 against tool holder 22. The spring tension of the clamping fork can therefore be transformed to a clamping force for clamping the two parts 20, 22 against one another. By appropriate forming of the clamping fork in the stress-free condition, therefore, it is possible to increase the spring tension of the clamping fork and thus the bending stresses generated when tightening screw 42 is turned to the left.

The diagram in FIG. 5 makes it evident that the maximum extent to which clamping members 38 can be pinched together as tightening screw 42 is being turned to the left is when the two clamping members 38 become stopped against annular portion 54 of tightening screw 42. By appropriate dimensioning of the axial length of shank portion 55, therefore, it is ensured that threaded portion 56 cannot become disengaged from threaded bore 62. In this fully pinched-together condition of clamping members 38, the engagement of wedge faces 36 of tightening screw 38 with undercut clamping shoulder 34 of hollow shank 28 is released, and so tool 20 can be removed from the tool holder.

From the diagram according to FIG. 1 it is evident that clamping members 38 can be moved apart from one another when tightening screw 42 is turned to the right only to the extent that they bear against the inside circumferential wall of holding portion 32 of the tool holder. In this way, even without a tool-dependent stop for limiting the clamping stroke of the clamping members, it is ensured that a maximum permissible clamping stroke, beyond which threaded portion 56 of tightening screw 42 would become disengaged from threaded bore 62 of clamping member 38, cannot be exceeded. Further turning of tightening screw 42 after the maximum permissible clamping stroke of clamping members 38 has been reached is therefore prevented automatically by the fact that the clamping elements bear against the circumferential wall of the recess in the holding portion.

According to the clamped position shown in FIG. 1, clamping members 38 are pushed back via wedge faces 36 against the wedge face of clamping shoulder 34, thus becoming mutually braced against tightening screw 42.

In the clamped position of the inventive clamping system shown in FIG. 1, the contact between wedge faces 34, 36 ensures that hollow shank 28 of tool 20 tends to be flared, whereby the close-fitting contact between hollow shank 28 and recess 31 becomes even more intimate. In this clamped condition, therefore, a frictional and nonpositive connection exists between the close-fitting faces of hollow shank 28 and recess 30 on the one hand and between wedge faces 34, 36 on the other hand, whereby clamping device 39 becomes fixed in its angular orientation relative to tool holder 22.

Further constituents of the inventive clamping system constitute a push-off attachment as well as a coolant and lubricant supply system, which in this practical example are designed as one component and will therefore be referred to hereinafter as C&L push-off attachment 80.

Figure 8:
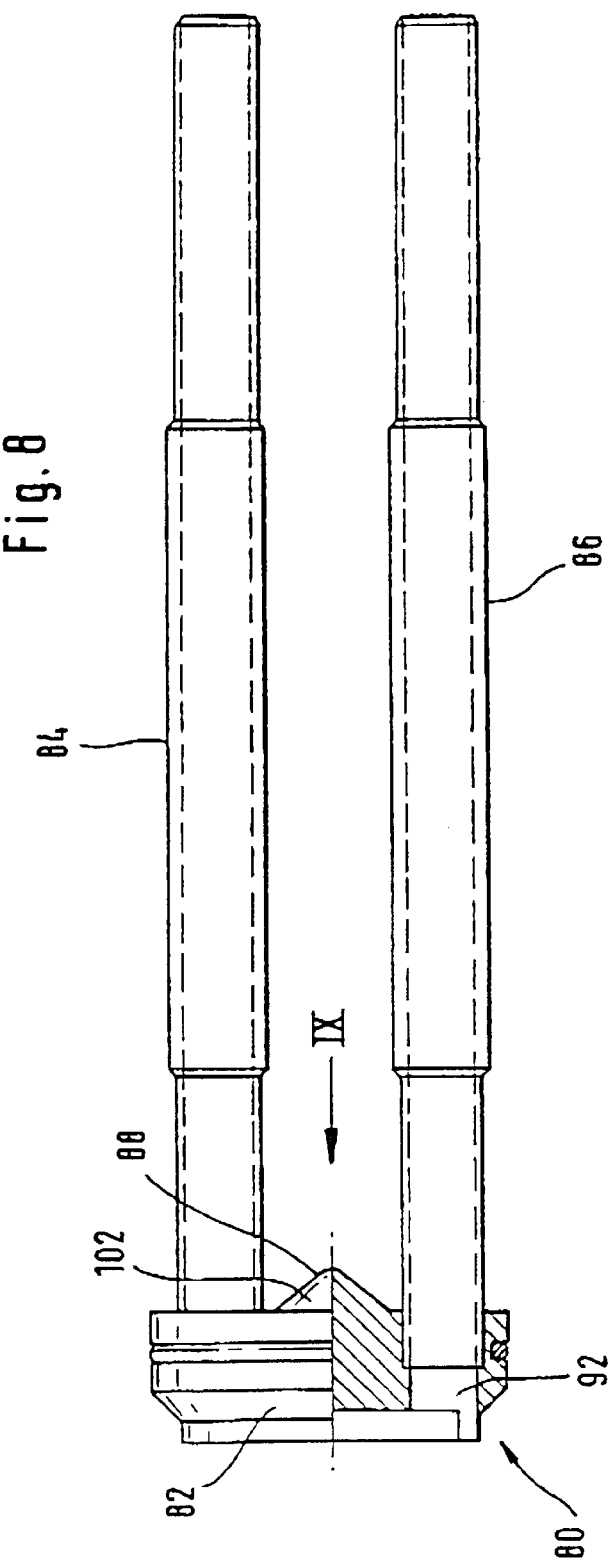
FIG. 8 is a schematic view—partly cutaway—of a coolant and lubricant push-off attachment.
Figure 9:
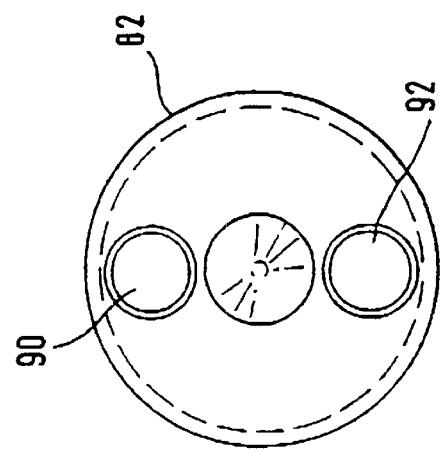
FIG. 9 is a schematic view of a push-off piston viewed in a direction corresponding to arrow "IX" in FIG. 8.

The structure of this C&L push-off attachment is illustrated in particular in FIG. 8 and FIG. 9. C&L push-off attachment 80 comprises substantially a push-off piston 82 as well as two tubes 84, 86. Push-off piston 82 is designed as a rotationally symmetric component with a centrally disposed projection 88 as well as two axial recesses, preferably bores 90, 92, as is evident from FIG. 9. Tubes 84, 86 are brazed in sealed relationship into axial recesses 90, 92 of the part supporting the hollow shank, and in the installed condition according to FIG. 1 or FIG. 2 they extend from push-off piston 82 into guide recess 31 of holding portion 32 of tool holder 22.

As shown in FIG. 1 and FIG. 2, push-off piston 82 is disposed in sealed relationship in a central recess 94 of tool 20, by means of a sealing ring held in a corresponding annular groove on the outside circumference of push-off piston 82. As follows in particular from FIG. 3 and FIG. 4, a plane El connecting the central axes of tubes 84, 86 and including longitudinal or rotational axis 43 is turned by 90° relative to a plane E2 connecting clamping elements 40 and also including longitudinal or rotational axis 43. According to FIG. 1 and FIG. 2, tubes 84, 86 extend into guide recess 31 of holding portion 32 of tool holder 22 via correspondingly disposed axial recesses 94, 96 of foot or connecting portion 41 of the clamping fork to correspondingly provided recesses 98, 100 of tool holder 22. Whereas the shank portions of tubes 84, 86 are held in easily movable relationship in axial recesses 94, 96 of articulated joint portion 41, they are held in close-fitting relationship in axial recesses 98, 100 of tool holder 22, there being provided for sealing recesses 94a , 96a, in each of which there is held a sealing ring, as shown in FIG. 6.

Axial recesses 94, 96 of the tool as well as axial recesses 98, 100 of the tool holder constitute channel portions of the coolant and lubricant supply system. Tubes 84, 86 on the one hand have the function of line portions communicating between the channel portions in tool 20 and tool holder 22 and bridging clamping device 39, and on the other hand provide further fixation of the angular orientation of the clamping device in the tool holder in addition to that created by the bracing of the tool and tool holder, by the fact that they are held in axial recesses of articulated joint portion 41 of clamping device 39. In this way relative turning of the clamping device in the tool holder is prevented, especially in detached position of the clamping system.

As follows in particular from FIG. 4, the two clamping members 38 in detached position of the clamping system pinch the two tubes 84 and 86 in such a way that C&L push-off attachment 80 is prevented by simple means from falling out when the clamping system is in detached position.

Push-off piston 82 of C&L push-off attachment 80 has a central projection 88 with a tapered face 102 on the side directed toward the tool holder and especially clamping members 38. When the engagement of wedge faces 36 of clamping members 38 with the wedge face provided on undercut clamping shoulder 34 is detached by turning tightening screw 42 in appropriate direction, clamping members 38 move radially inward toward one another. The functional contact between wedge faces 36 and clamping shoulder 34 is gradually released. At the same time, clamping members 38 travel synchronously over tapered face 102 of push-off piston 82. When tightening screw 42 is turned further, the radially acting force applied by tightening screw 42 on clamping members 38 is transformed to an axially directed force acting on push-off piston 82, whereby this is pushed with increasing force against a bracing face 104 of central recess 94 of tool 22, so that a centrally acting, positive force is applied on the tool. In this way clamping members 38 become synchronous with the constituent of a wedge-type mechanism, with which hollow shank 28 can be forced out of holding portion 32, while push-off piston 82 is braced against bracing face 104. This leads accordingly to automatic separation of the connection created between tool and tool holder by the engagement of wedge faces 36 of clamping members 38 with undercut clamping shoulder 34. Since the push-off piston is centrally disposed, symmetric force relationships can be achieved very easily for the push-off process, and so reliable separation of the two parts 20, 22 can be achieved even in the case of the most intimate adhesion between tapered centering faces on the outside face of the hollow shank on the one hand and on the sides of recess 30 of holding portion 32 on the other hand.

Assembly/disassembly of the tool on/from the tool holder as well as the mode of operation of the inventive clamping system will be described in more detail hereinafter, assuming an initial condition in which all components, meaning the tool, the tool holder and the clamping device constitute individual parts, or in other words are separated from each other.

The first step of assembly of the tool on the tool holder is to pinch clamping members 38 together. To do so, a suitable tool 63, which in the explained practical example is an Allen key, is first introduced into recess 60, which in the case of this practical example is a hexagon socket, of tightening screw 42 and then turned to the left. Of course, the tightening screw must already have been inserted beforehand into the corresponding recesses 62, 57 of clamping members 38, as illustrated in FIG. 5 and FIG. 6. The leftward turning of tightening screw 42 causes the two clamping members 38 to move toward one another, until upper clamping member 38 in FIG. 5 bears against annular portion 54 of tightening screw 42, which is securely retained in lower clamping member 38. In this condition, retaining portions 44 of clamping elements 40 can be fitted into a circle having a diameter corresponding approximately to that of recess 31 of holding portion 32 of tool holder 22; in any case, retaining portions 44 are not permitted to hinder the insertion of the clamping device into tool holder 22 as described hereinafter. With the pinching together of clamping members 38 in the manner described hereinabove, bending stresses are generated in the clamping fork, or in other words in clamping elements 40 and in connecting portion 41 in particular, which stresses are relieved once again when the tightening screw is subsequently turned to the right and which can therefore be used positively on the one hand for the radial stroke of the clamping members and on the other hand for bracing the tool with the tool holder.

Even in the case of a clamping device in which the clamping elements are connected to one another by an articulated joint, bending stresses can be generated by appropriate configuration of the foot portions forming the articulated joint.

Since the clamping elements are connected to one another at their foot portions and thus are moved radially outward in opposite directions in any case when the tightening screw is turned to the right, it is not absolutely necessary, however, that the radial stroke of the clamping members be assisted by bending stresses generated beforehand when the clamping elements were pinched together. It is self-evident that the bracing or mutual clamping of the tool against the tool holder can also be achieved merely by the force applied radially to clamping members 38 by virtue of actuation of tightening screw 42.

In the pinched-together condition of the clamping fork, clamping device 39 can be introduced into guide recess 31 of holding portion 32 of tool holder 22, as can be seen from FIG. 2 and FIG. 4.

Clamping members 38 are then moved radially outward by turning tightening screw 42 to the right by means of tool 63 inserted via radial openings 64 and 66 of tool 20 and tool holder 22 into recess 60 of tightening screw 42, whereby the bending stresses generated when clamping members 38 were pinched together are relieved. As clamping members 38 or clamping elements 40 move apart from one another, retaining portions 44 simultaneously engage in recess 46 of holding portion 32, thus achieving axial fixation of clamping device 39 in guide recess 31 of holding portion 32 of tool holder 22. This condition is evident from the diagram in FIG. 1 and FIG. 3.

C&L push-off attachment 80 can now be introduced into tool holder 22 and its angular orientation adjusted in the manner evident from the diagram in FIG. 1 and FIG. 3. Once C&L push-off attachment 80 has been correctly positioned, tubes 84, 86, which extend through the axial recesses of foot or connecting portion 41, bring about fixation of the angular orientation of clamping device 39 in guide recess 31 of holding portion 32 of tool holder 22.

By turning tightening screw 42 to the left, clamping members 38 are then pinched together once again until they bear against tubes 84, 86, as illustrated in FIG. 2 and FIG. 4. From the diagram in FIG. 4 it follows in particular that upper clamping member 38 is prevented from becoming stopped against annular portion 54 of tightening screw 42 in this condition by the fact that it bears against tubes 84, 86. Consequently retaining portions 44 are still engaged, albeit only partly, with recess 46 of guide recess 31 of holding portion 32 of tool holder 22. This is sufficient to prevent clamping device 39 from falling out of recess 31, especially when tool holder 22 is in vertical position. As is further evident from FIG. 2, the portions of clamping elements 40 adjoining clamping members 38 no longer bear over the full support length against the inside circumferential wall of recess 31. This condition corresponds to the detached condition of the clamping system, in which tool 20 can be exchanged.

In the detached position of the clamping system, clamping members 38 additionally bear against tapered face 102 of push-off piston 82 of C&L push-off attachment 80, as can be seen in FIG. 2.

In the detached position, tool 20 with its hollow shank 28 can be inserted into the corresponding recess 30 in holding portion 32 of the tool holder, as is evident in FIG. 2. When in detached position, tool 20 becomes stopped against push-off piston 82, which itself bears in turn against clamping members 38. In the detached position, a plane gap in the range of 1/10 mm remains between radial annular faces 24, 26 of tool 20 and tool holder 22, because push-off piston 82 projects axially from tool holder 22 when the clamping system is in detached position.

After insertion of tool 20 into corresponding recess 30 of tool holder 22, actuating screw 42 is turned to the right, thus causing clamping members 38 to move radially apart from one another. As tightening screw 42 is turned further, wedge faces 36 provided on clamping members 38 become engaged with undercut clamping shoulder 34 of hollow shank 28 on the one hand, while the end faces of clamping members 38 synchronously become disengaged from tapered face 102 of push-off piston 82. Accordingly, further turning of tightening screw 42 leads to clamping of tool 20 against tool holder 22, whereupon the force directed radially toward the clamping members and applied on clamping members 38 by the action of turning of the tightening screw and relaxation of the bending stress caused during pinching together of clamping members 38 is transformed via the wedge-type mechanism between wedge faces 34, 36 into an axial force directed toward tool holder 22, thus pulling tool 20 into the recess of tool holder 22. Similarly, because tool 20 is pulled into tool holder 22, push-off piston 82 is pushed into holding portion 32 of tool holder 22. Because of the tapered close-fitting faces on hollow shank 28 and in the corresponding recess of tool holder 22, there is produced slight flaring of holding portion 32, whereby firm bracing between tool 20 and tool holder 22 is obtained. Simultaneously, retaining portions 44 become completely engaged with corresponding recess 46, leading to a tensile stress with increasing clamping force in the regions of the clamping elements between clamping members 38 and the retaining portions. The clamped position of the inventive clamping system is shown in FIG. 1 and FIG. 3.

During clamping of tool 20 against tool holder 22, tool 20 pushed C&L attachment 80 into tool holder 22, as mentioned hereinabove. Coolant and lubricant supply lines for the supply of coolant and lubricant to the tool are created via channels formed in tool 20, which supports hollow shank 28, and in the tool holder, as well as via tubes 84, 86.

Tool 20 is changed substantially in the reverse sequence. The initial condition in this case is the clamped position shown in FIG. 1. By turning tightening screw 42 to the left, clamping members 38 move toward one another, whereupon the engagement of wedge faces 36 of clamping members 38 with undercut clamping shoulder 34 of recess 30 of holding portion 32 is relaxed on the one hand and clamping members 38 travel over tapered face 102 of push-off piston 82 on the other hand. By means of these processes the bracing between tool 20 and tool holder 22 is relaxed as tightening screw 42 is further turned, and at the same time tool 20 is pushed out of tool holder 22.

Naturally it is not necessary to remove the clamping device from tool holder 22 in order to change the tool; instead, it is sufficient to bring the clamping system into the detached position shown in FIG. 2.

As regards the permissible stresses in the components disposed in the flow of force from clamping system to tool to tool holder, the favorable circumstance arises that clamping elements 40 of the clamping fork, which have limited cross section for structural reasons, are subjected in clamped position of the clamping system to pure tensile stresses, whereas bending stresses prevail in the detached position of the clamping system. Since the loadability of the clamping elements represents a limit for the achievable clamping force of coupling of the tool and tool holder, a maximum level of clamping force for given cross section of the clamping elements can be achieved with pure tensile loading.

The necessary radial stroke of the clamping members for changing the tools, as well as the mechanical conversion of the radially applied tightening-screw force into an axially acting clamping force can be achieved by taking advantage of the elastic deformation of the clamping fork, without additional movable interlocking parts in the clamping system. The friction in the clamping system is thereby reduced to a minimum, whereby a distinct increase of clamping force is achieved compared with conventional clamping systems.

Compared with conventional clamping systems, the clamping system according to the invention substantially comprises only three components, namely the clamping fork, the tightening screw and the C&L push-off attachment. The detached position of the inventive clamping system is also its assembly position. Additional components and assembly attachments are therefore unnecessary.

In the practical example described hereinabove, the clamping fork has two clamping elements, each with one clamping member. The present invention is not limited merely to such a configuration, however, but can also be provided with more than two clamping members.

In the practical example described hereinabove, the clamping fork is of one-piece design. Within the meaning of the present invention, however, it would also be conceivable to construct the clamping fork from two "hemispherical" clamping elements, which can be connected movably to one another at their foot portions via an articulated joint, the axis of rotation of which is disposed perpendicular to the longitudinal or rotational axis of the holding portion. Similarly, the clamping elements could also be connected to one another in rotationally fixed relationship via an appropriate configuration of their foot portions that permits an interlocking and/or frictional connection. For example, the foot portions of the clamping elements could be designed as portions which are "hemispherical" relative to the axis of rotation of the holding portion, each being provided at the joint face directed toward the other with a wedge-type toothing, which permits reliable clamping together of the two clamping elements.

FIG. 10, FIG. 11, FIG. 12 and FIG. 13 show a second practical example of the present invention. This second practical example differs from the first practical example substantially only in the axial fixation of clamping device 39 in the holding portion. Thus only the differences compared with the first practical example will be explained hereinafter.

Figure 10:
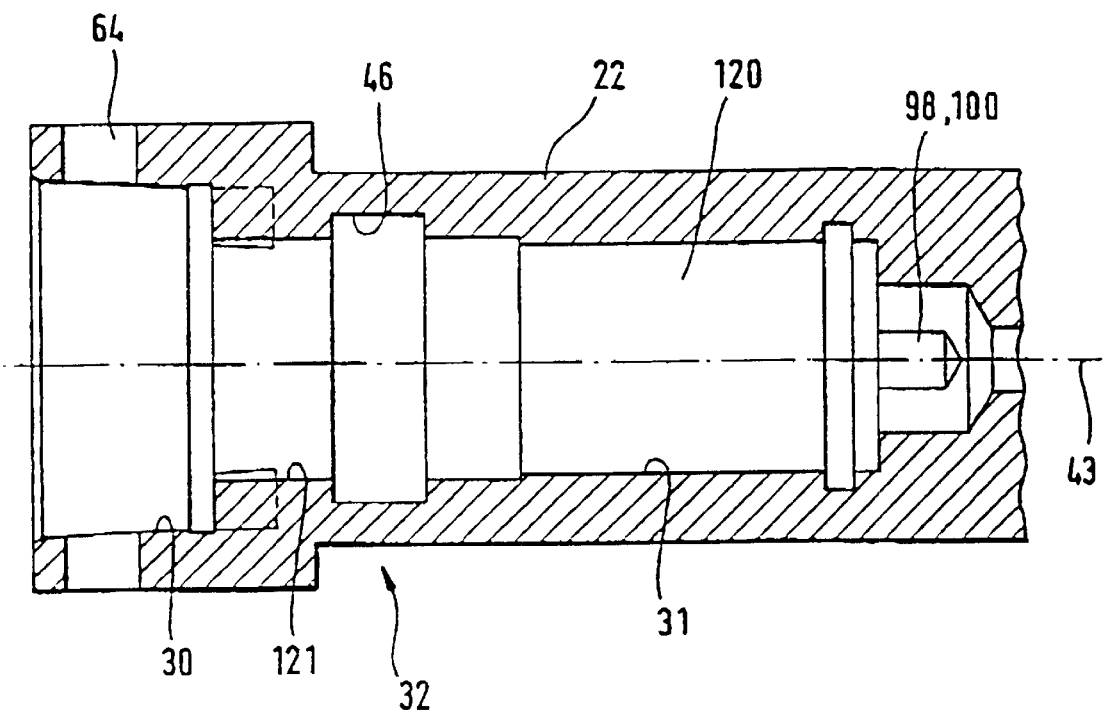
FIG. 10 is a cross section of the holding portion of the tool holder according to a second practical example.

Holding portion 32 of tool holder 22 is illustrated in longitudinal section in FIG. 10. As follows from FIG. 10, holding portion 32 is provided with an axial, central recess 120, which substantially comprises recess 30 for hollow shank 28, a recess 121 in the form of an elliptical cross section and cylindrical guide recess 31. In recess 121 of elliptical cross section there is formed recess 46 in the form of a closed annular cross section for nesting of retaining portions 44 of clamping elements 40.

Figure 11:
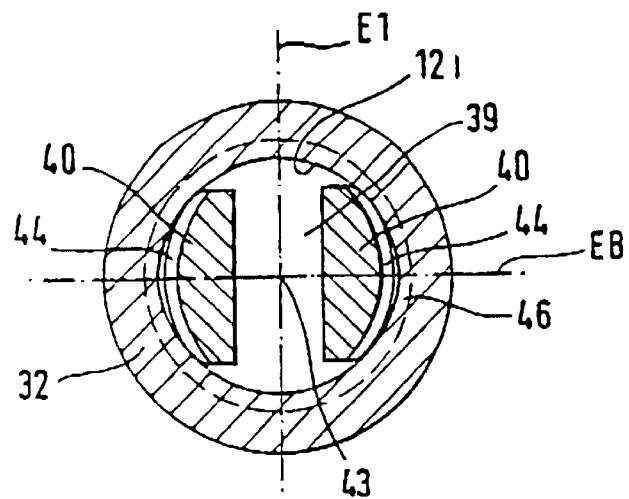
FIG. 11 and FIG. 12 are cross sections through the clamping device along line XI—XI in the detached condition of the clamping system according to the second practical example.
Figure 12:
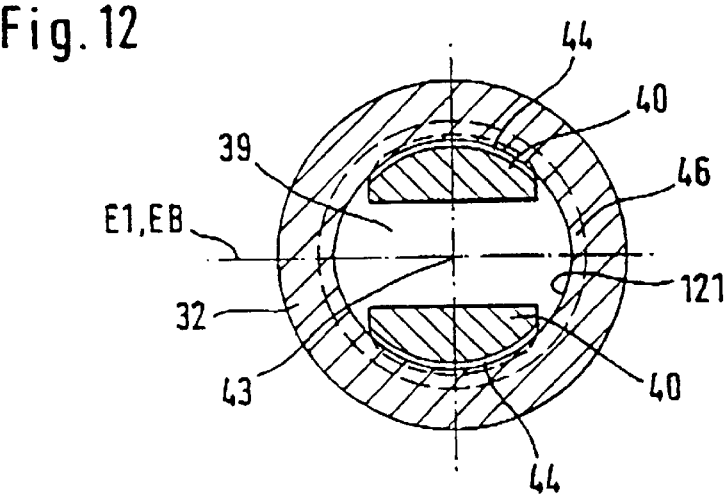
Figure 13:
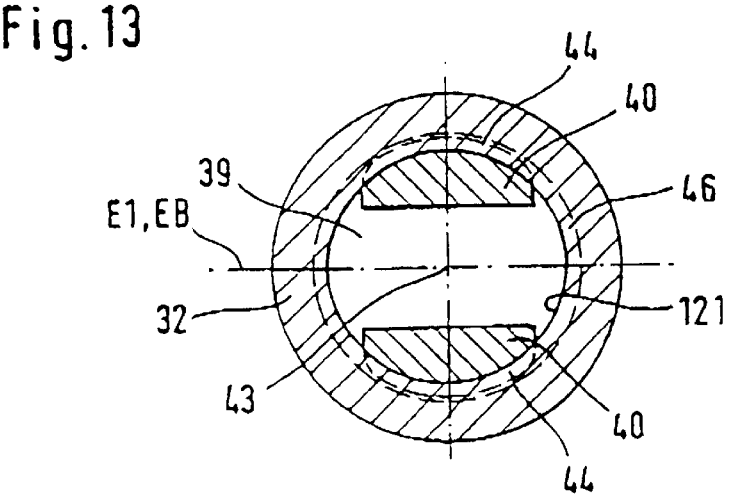
FIG. 13 is a cross section through the clamping device along line XIII—XIII in the clamped condition of the clamping system according to the second practical example.

Recess 121 in the form of an elliptical cross section can be seen in particular in FIG. 11, FIG. 12 and FIG. 13. FIG. 11 and FIG. 12 correspond substantially to a cross section through the inventive clamping system shown in FIG. 2 in joined-together condition, clamping device 39 together with clamping elements 40 being shown in different angular orientations. FIG. 13 corresponds to a cross section through the inventive clamping system in clamped condition, as shown in FIG. 1.

On the basis of the diagrams in FIG. 11, FIG. 12 and FIG. 13, installation/removal of clamping device 39 in/from recess 120 of holding portion 32 of tool holder 22 will be explained hereinafter. Assembly/disassembly of the tool on/from the tool holder takes place substantially in the same manner as in the first practical example, and so further explanations in this regard are unnecessary.

Installation of clamping device 39 begins firstly with pinching together of the clamping fork, or in other words clamping members 38 of clamping elements 40. This takes place in the same manner as was explained in relation to the first practical example.

In the pinched-together condition of the clamping fork, clamping device 39 can then be introduced axially into recess 120 of holding portion 32 of tool holder 22, the angular orientation of the clamping device relative to tool holder 22 during introduction into recess 120 being illustrated in FIG. 11. In this angular orientation, plane El is oriented perpendicular to a plane EB, which connects the foci of the elliptical cross section of recess 121 and includes longitudinal or rotational axis 43. Accordingly, clamping elements 40 of clamping device 39 only have to be pinched together radially to the extent that substantially cylindrical clamping device 39 can be introduced into elliptical recess 121.

Whereas in the first practical example clamping members 38 are moved radially outward only by turning tightening screw 42 to the right in order to be able to fix clamping device 39 axially in recess 120, in the second practical example clamping device 39 is merely turned around axis of rotation 43 by 90° relative to tool holder 22 after it has been inserted completely into recess 121, or in other words is bearing against the bottom of guide recess 31, so that plane El and plane EB are disposed in a common plane. In the process, the direction in which the clamping device is turned is immaterial. As shown in FIG. 12, such turning of the clamping device has the consequence that retaining portions 44 are brought into engagement with undercut recess 46, and so clamping device 39 becomes axially fixed in holding portion 32 of tool holder 22.

After insertion of the tool into the tool holder, the clamping system is ultimately brought into the clamped condition by turning tightening screw 42 to the right, as is known from the first practical example illustrated in FIG. 1.

Removal of clamping device 39 from recess 121 of tool holder 22 naturally takes place in reverse sequence.

Accordingly, this second practical example differs from the first practical example only in the features of the axial fixation of the clamping device in the tool holder, which in this case takes place substantially in the manner of a bayonet fastener.

FIGS. 14 to 20 show a third practical example of the inventive clamping system. The third practical example of the inventive clamping system differs from the first and second practical examples substantially only in the configuration of clamping elements 40 of the clamping fork as well as tightening screw 42. Thus only the differences compared with the first practical example will be explained hereinafter.

Figure 14:
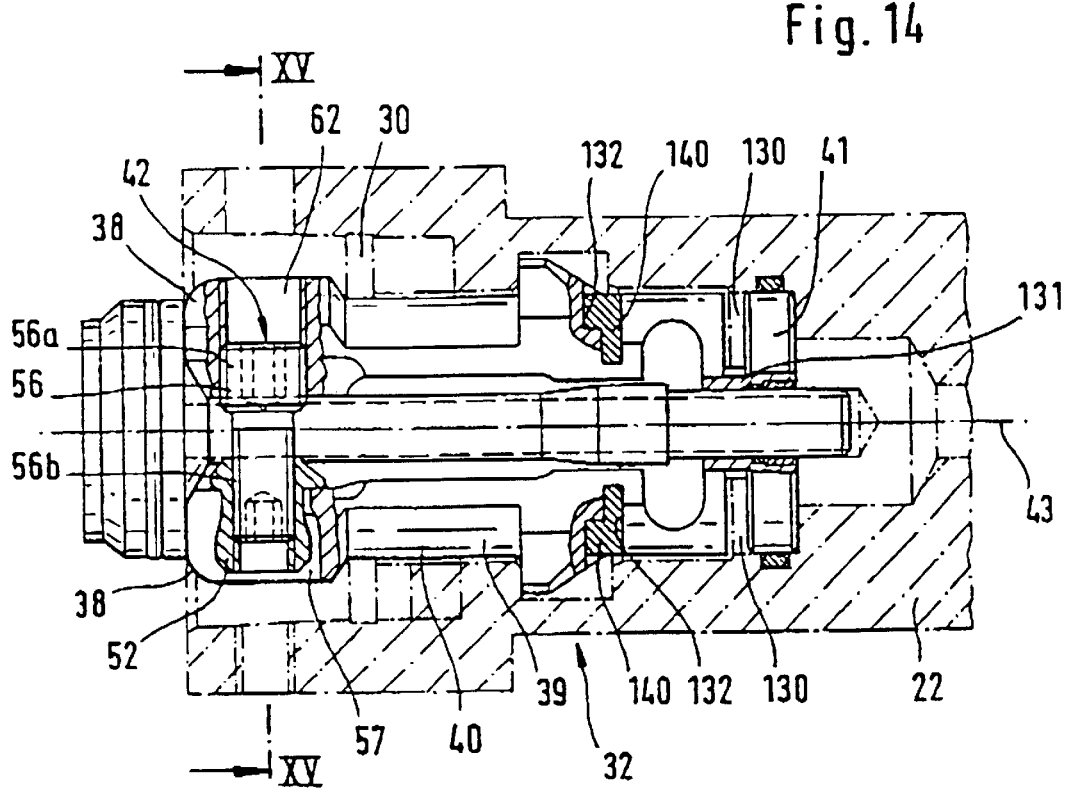
FIG. 14 is a schematic axial section—in partly cutaway view—of the inventive clamping system according to a third practical example with the two parts to be connected in clamped-together condition.
Figure 16:
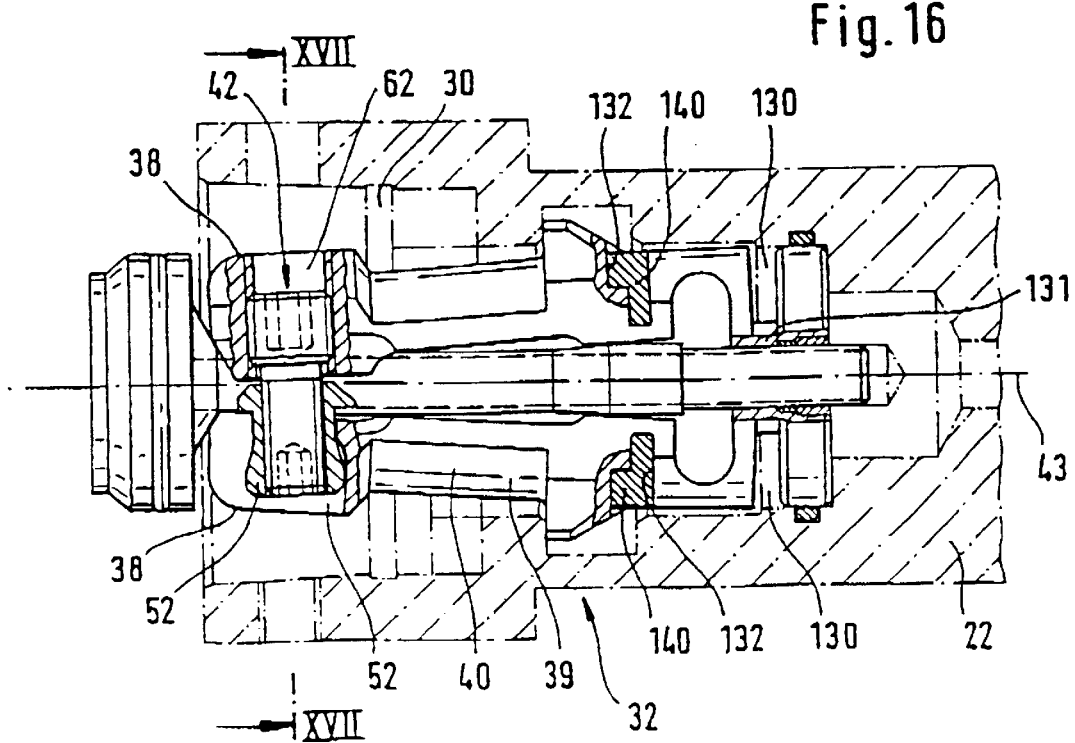
FIG. 16 is a cross section through the inventive clamping system in FIG. 14 along line "XV—XV"
Figure 15:
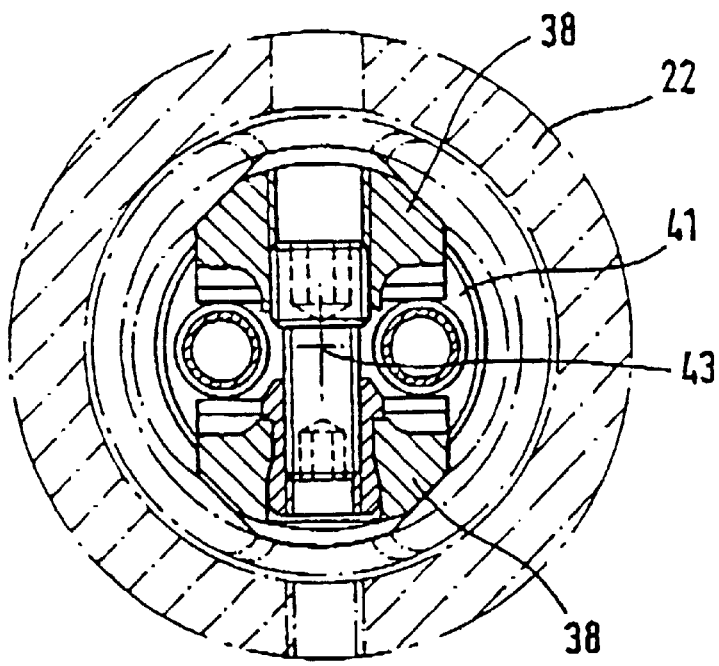
FIG. 15 is a schematic axial section—in partly cutaway view—of the inventive clamping system according to the preferred practical example with the two parts to be connected in clamped-together condition.
Figure 17:
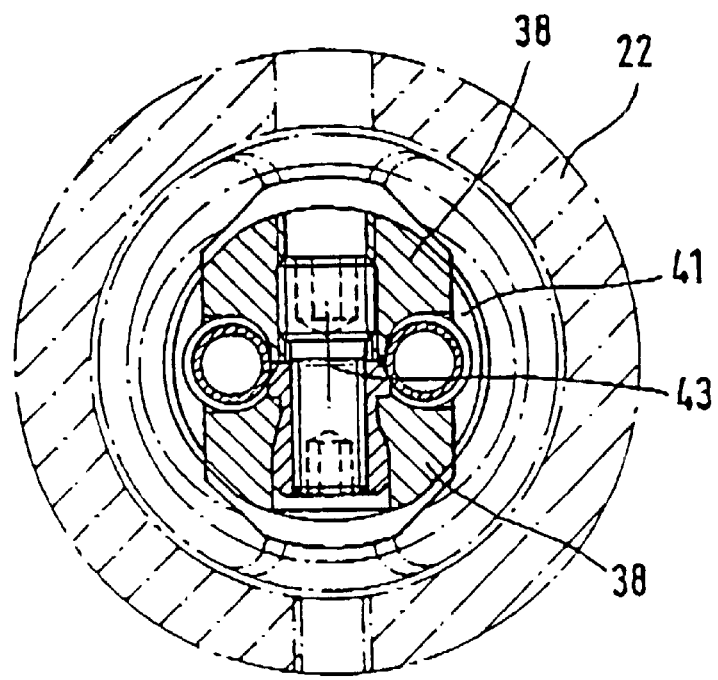
FIG. 17 is a cross section through the inventive clamping system in FIG. 16 along line "XVII—XVII"
Figure 18:
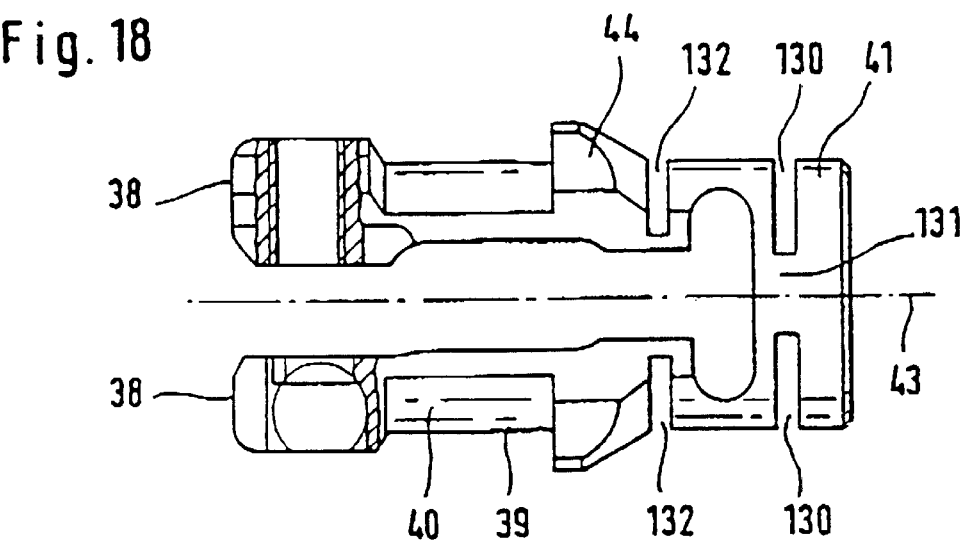
FIG. 18 is a side view—partly cutaway—of the clamping device of the inventive clamping system according to the third practical example.
Figure 19:
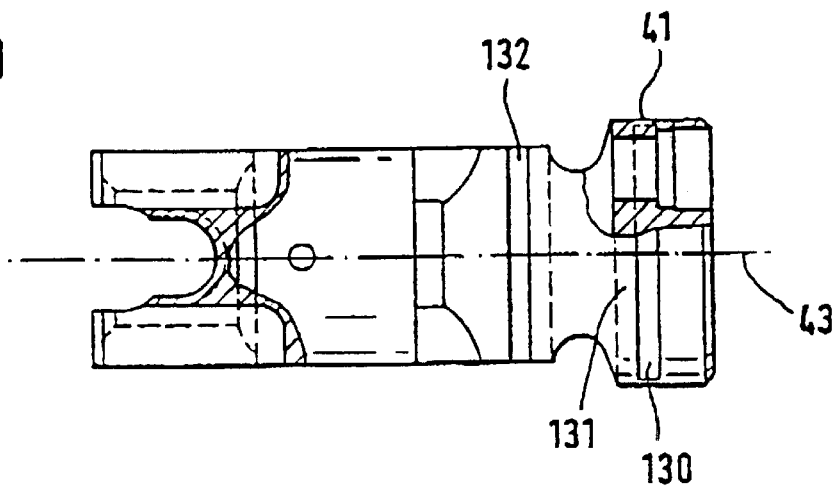
FIG. 19 is a top view—partly cutaway—of the clamping device of the inventive clamping system according to the third practical example.
Figure 20:
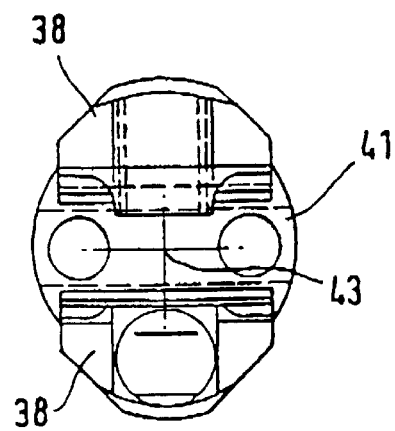
FIG. 20 is a front view of the clamping device of the inventive clamping system according to the third practical example.

FIGS. 14 and 15 show the inventive clamping system in the clamped condition. FIGS. 16 and 17 show the inventive clamping system in detached condition. In FIGS. 18 to 20, the clamping fork of the inventive clamping system is illustrated in various views.

As is evident in particular from FIGS. 18 and 19, clamping elements 40 are each provided on the sides of their foot portions 41 connected as one piece with two notches 130 and 132 normal to longitudinal or rotational axis 43 of tool holder 22, the said notches being produced, for example, by milling. Notches 130 and 132 reduce the cross section of clamping elements 40 compared with the cross sections of clamping elements 40 in the first and second practical example. In the third practical example of the inventive clamping system, portion 131 in the region of notches 130 functions in particular as a "material articulated joint", which is elastically deformed when the clamping system is detached, or in other words when the two clamping elements 40 are pinched together as tightening screw 42 is turned. By virtue of this feature, which is simple to achieve structurally, the force necessary to pinch the two clamping elements 40 together, or in other words to bring the clamping system into the detached position illustrated in FIGS. 16 and 17, is smaller by comparison with the first and second practical examples, in which clamping elements 40 are not provided with notches. In order to be able to apply the force necessary to pinch clamping elements 40 together in the clamping system according to the first and second practical examples, clamping elements 40 must have a certain "lever length", considered in axial direction. In the third practical example, by virtue of the reduction of the cross section of clamping elements 40 by notches 130 and 132, a smaller force is necessary to pinch clamping elements 40 together, or in other words to bring the clamping system into the detached position illustrated in FIGS. 16 and 17. If it is required that the same pinching force can be applied on the two clamping elements 40 in the clamping system according to the first, second and third practical example by turning tightening screw 42, notches 130, 132 provided on clamping elements 40 of the clamping system according to the third practical example therefore permit considerable shortening of clamping elements 40 and thus of the clamping system on the whole. Besides the material and weight savings achieved in this way and the resulting lower manufacturing costs, simpler assembly is additionally possible by this feature, which is simple to achieve structurally.

Bracing segments 140, which can be seen in FIGS. 14 and 16, are disposed in notches 132. The purpose of bracing segments 140 is to prevent "kinking" of clamping elements 40 in response to a torque, oriented in clockwise direction relative to FIGS. 14 and 16, while the clamping system is being clamped, or in other words when clamping elements 40 are moving apart from one another. In the detached position of the clamping system shown in FIG. 16, these bracing elements, which preferably are made from aluminum or another metal, are freely movable in notches 132. In the clamped position of the clamping system shown in FIG. 16, these bracing segments 140 are pinched between the flank faces defining notches 132, thus imparting stiffness to clamping elements 40, so that neither one can kink "backward" around an imaginary fulcrum represented by the inside circumferential wall portion of guide recess 31 of holding portion 32 between undercut recess 46 and recess 30 of holding portion 32.

A further difference of the clamping system according to the third practical example compared with the clamping system according to the first and second practical examples can be recognized in the configuration of tightening screw 42. Whereas tightening screw 42 in the first and second practical examples is made in one piece with head portion 52 and threaded portion 56, tightening screw 42 according to the third practical example has two-piece configuration. From FIGS. 14 to 17 it follows that tightening screw 42 has a threaded portion 56 with a left-hand threaded portion 56b and a right-handed threaded portion 56a, one of which is disposed in threaded bore 62 of upper clamping member 38 in FIGS. 14 to 17 and the other is disposed in a nut functioning as head portion 52 and disposed in recess 57 of lower clamping member 38. The advantage of this configuration is that, by virtue of the left-hand/right-hand thread of tightening screw 42, relatively small turning movements are necessary to bring about a relatively large "stroke" of clamping members 38; furthermore, the nut functioning as head portion 52 is loaded substantially only in tension, and so neither the nut nor the corresponding clamping members 38 are subjected to severe frictional wear. Further refinements of this tightening screw 42 according to the third practical example are evident in FIGS. 14 to 17.

Assembly/disassembly of the tool on/from the tool holder as well as the mode of operation of the clamping system according to the third practical example take place in principle in the same manner as in the clamping systems according to the first and second practical examples, and so more detailed explanation is not necessary at this place.

Naturally the specific features of the first, second and third practical examples can be combined with one another or substituted for one another as desired, to the extent that this is technically possible and seems to be expedient.

The present invention therefore provides a clamping system for detachably connecting two parts, which preferably are rotationally symmetric, of which one part has a preferably cylindrical or tapered hollow shank and the other part has a corresponding holding portion for holding the hollow shank in accurately fitting relationship. The clamping system is provided with a clamping device, which is disposed concentrically in the holding portion and which, in the joined-together condition of the two parts, extends into the hollow shank of the one part and is provided with at least two clamping members which can move in opposite directions as well as with an actuating device for driving the clamping members. The clamping members can be engaged with and disengaged from an undercut clamping shoulder of the hollow shank, whereby a pressing force is generated between plane faces of the two parts to be connected. The clamping members are constructed as head portions of elongated clamping elements, which are disposed substantially parallel to the longitudinal or rotational axis of the holding portion and the foot portions of which are connected to one another.

What is claimed is:

1. A clamping system for detachably connecting two parts, of which one part has a hollow shank and the other part has a corresponding holding portion for holding the hollow shank in accurately fitting relationship, with a clamping device, which is disposed concentrically in the holding portion and which, in the joined together condition of the two parts, extends into the hollow shank of the one part and is provided with at least two clamping members which can move in opposite directions as well as with an actuating device for driving the clamping members, by means of which device the clamping member can be synchronously moved into and out of engagement with an undercut clamping shoulder of the hollow shank, whereby a pressing force is generated between plane faces of the two parts to be connected, the clamping members being constructed as head portions of elongated clamping elements, which are disposed substantially parallel to a longitudinal or rotational axis of the holding portion and foot portions of which are connected to one another, characterized in that the clamping elements are each provided in a region between head and foot portions with a retaining portion, which can be brought into engagement with an undercut recess of the holding portion.

2. A clamping system according to claim 1, characterized in that the clamping elements have the form of legs of a U-shaped clamping fork of one-piece structure.

3. A clamping system according to claim 1, characterized in that the foot portions of the clamping elements are connected to one another by an articulated joint, the axis of rotation of which is disposed perpendicular to the longitudinal or rotational axis of the holding portion.

4. A clamping system according to one of claims 1, characterized in that the clamping elements are each provided in a region between head and foot portions with a retaining portion, which can be brought synchronously with the engagement of the clamping members with the undercut clamping shoulder of the hollow shank into engagement with an undercut recess of the holding portion.

5. A clamping system according to claim 4, characterized in that the undercut recess has a closed annular cross section.

6. A clamping system according to claim 1, characterized in that the clamping members are each provided with a wedge face which cooperates with a mating face provided on the undercut clamping shoulder of the hollow shank.

7. A clamping system according to claim 6, characterized in that the undercut clamping shoulder is part of a recess formed with a closed annular cross section in the hollow shank.

8. A clamping system according to claim 1, characterized in that the clamping device is disposed in a corresponding guide recess of the holding portion and at the bottom of the guide recess bears against an annular seal.

9. A clamping system according to claim 1, by a push-off attachment, which can be actuated axially by the clamping members upon detachment of the engagement with the undercut clamping shoulder, and which is used for separation of the two parts to be connected.

10. A clamping system according to claim 9, characterized by a push-off piston as part of the push-off attachment, which piston is disposed in a central recess in the part supporting the hollow shank and which, when the engagement of the clamping members with the undercut clamping shoulder is detached, can be pressed synchronously with increasing force against a bracing face in the recess, whereby a centrally acting, positive force is applied on the part supporting the hollow shank.

11. A clamping system according to claim 10, characterized in that, upon detachment of the engagement with the undercut clamping shoulder of the hollow shank, the clamping members move toward one another and simultaneously travel over a tapered face formed on the push-off piston.

12. A clamping system according to claim 9, characterized in that there is disposed in a circumferential groove of the push-off piston a sealing ring, via which the push-off piston bears against the circumferential wall of the recess.

13. A clamping system according to claim 1, characterized by a coolant and lubricant supply system, which comprises a channel portion formed in the part supporting the holding portion, a channel portion formed in the part supporting the hollow shank, and at least one line portion bridging the clamping device and ensuring fixation of the angular orientation thereof relative to the holding portion.

14. A clamping system according to claim 13, characterized in that the line portion comprises a tube disposed between the parts to be connected, the end of the tube on the hollow-shaft side being held in a corresponding recess of a push-off piston, the shank portion of the tube being guided in axially movable relationship through a corresponding recess of the connecting portion of the clamping device, and the end of the tube on the holding-portion side being held in close-fitting relationship in a corresponding recess in the part supporting the holding portion.

15. A clamping system according to claim 13, characterized in that the line portion is positioned between the clamping members in such a way that the clamping members pinch the line portion when the clamping system is in detached position.

16. A clamping system according to claim 1, characterized in that the pressing faces of the parts to be connected are designed as radial annular faces.

17. A clamping system according to claim 1, characterized in that the close-fitting faces between hollow shank and holding portion have the form of tapered faces.

18. A clamping system according to claim 1, characterized in that the holding portion and the hollow shank are each provided with a radial opening oriented perpendicular to the longitudinal or rotational axis into which a tool can be introduced from outside to drive the actuating device.

19. A clamping system according to claim 18, characterized in that the actuating device is a tightening screw with a head portion disposed in a corresponding recess of the one clamping member and a threaded portion disposed in a corresponding threaded bore of the other clamping member.

20. A clamping system according to claim 1, characterized in that the clamping device is made from a cylindrical part, so that the clamping elements and the clamping members have an arcuate outside face and the connecting portion has a cylindrical outside face.

21. A clamping system according to claim 1, characterized in that, when the clamping system is in clamped condition, the portions of the clamping elements adjoining the clamping members bear against the inside circumferential wall of the guide recess of the holding portion.

22. A clamping system according to claim 19, characterized in that the threaded portion of the tightening screw has a left-hand threaded portion and a right-hand threaded portion, of which one of the right-hand threaded portion and the left-hand threaded portion is disposed in the threaded bore of the other clamping member and the other of the right-hand threaded portion and the left-hand threaded portion is disposed in a nut functioning as the head portion, the nut being disposed in the recess of the one clamping member.

23. A clamping system according to claim 1, characterized in that the clamping elements are each provided on the side of their foot portions with at least one notch which reduces the cross section.

24. A clamping system for detachably connecting two parts, said clamping system comprising:

a first part having a hollow shank, the hollow shank having an undercut clamping shoulder;

a second part having a holding portion configured to receive the hollow shank, said holding portion having an undercut recess; and a clamping device disposed within the holding portion and extending into the hollow shank, the clamping device having at least two clamping members and an actuating device configured to drive the at least two clamping members into and out of engagement with the undercut clamping shoulder, whereby a pressing force is generated between plane faces of the first part and the second part, the clamping members being head portions of elongated clamping elements, the elongated clamping elements having foot portions that are connected to one another, wherein the elongated clamping elements are provided in a region between head and foot portions with a retaining portion configured to engage the undercut recess of the holding portion.

\* \* \* \* \*